US012134203B2

(12) United States Patent
Westerhof

(10) Patent No.: US 12,134,203 B2
(45) Date of Patent: Nov. 5, 2024

(54) RAZOR HAVING A HAIR-CUTTING FIBER

(71) Applicant: KONINKLIJKE PHILIPS N.V., Eindhoven (NL)

(72) Inventor: Willem Auke Westerhof, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 267 days.

(21) Appl. No.: 17/795,003

(22) PCT Filed: Jan. 26, 2021

(86) PCT No.: PCT/EP2021/051683
§ 371 (c)(1),
(2) Date: Jul. 25, 2022

(87) PCT Pub. No.: WO2021/156097
PCT Pub. Date: Aug. 12, 2021

(65) Prior Publication Data

US 2023/0053723 A1 Feb. 23, 2023

(30) Foreign Application Priority Data

Feb. 4, 2020 (EP) .................................... 20155431

(51) Int. Cl.
*B26B 21/58* (2006.01)
*B26B 21/40* (2006.01)
(Continued)

(52) U.S. Cl.
CPC .......... *B26B 21/58* (2013.01); *B26B 21/4031* (2013.01); *B26B 21/56* (2013.01); *B26B 21/18* (2013.01)

(58) Field of Classification Search
CPC ....... B26B 21/54; B26B 21/56; B26B 21/565; B26B 21/58; B26B 27/002; B26B 21/4006; B26B 21/4031
(Continued)

(56) References Cited

U.S. PATENT DOCUMENTS 2,043,998 A 6/1936 Hadjopoulos
3,093,724 A * 6/1963 Johnson ............. A45D 26/0009 132/148
(Continued)

FOREIGN PATENT DOCUMENTS

CN 105533987 A 5/2016
EP 0888733 A2 1/1999
(Continued)

OTHER PUBLICATIONS

International Search Report and Written Opinion Dated Apr. 28, 2021 for International Application No. PCT/EP2021/051683 Filed Jan. 26, 2021.

(Continued)

*Primary Examiner* — Jennifer S Matthews

(57) ABSTRACT

Razor having a hair-cutting fiber having a hair-cutting section attached to a support in such a position relative to a skin engaging surface that the hair-cutting section is exposed to a user's skin for cutting through hairs when the skin engaging surface is in contact with the skin and moved over the skin. The hair-cutting section has a fiber diameter smaller than or equal to 7 μm and is made from a fiber material having a tensile strength larger than or equal to 5 GPa. A shaving method using such a razor is also described.

17 Claims, 5 Drawing Sheets

(51) Int. Cl.
*B26B 21/56* (2006.01)
*B26B 21/18* (2006.01)

(58) Field of Classification Search
USPC ........................................... 30/114, 115, 116
See application file for complete search history.

(56) References Cited

U.S. PATENT DOCUMENTS

| | | | | |
|---|---|---|---|---|
| 3,197,612 A | | 7/1965 | Reich | |
| 4,051,760 A | | 10/1977 | Glennan | |
| 5,579,580 A | * | 12/1996 | Althaus | B26B 21/22 30/50 |
| 2012/0192432 A1 | * | 8/2012 | Zane | B26B 21/28 30/346.5 |
| 2014/0123497 A1 | * | 5/2014 | Zhuk | B26B 21/22 76/104.1 |
| 2014/0182830 A1 | * | 7/2014 | Jang | F28F 21/02 165/185 |

FOREIGN PATENT DOCUMENTS

| | | | | | |
|---|---|---|---|---|---|
| KR | 20110004979 A | | 1/2011 | |
| TW | 200630055 A | | 9/2006 | |
| WO | 03/009976 A1 | | 2/2003 | |
| WO | 2006/003641 A1 | | 1/2006 | |
| WO | WO-2017161341 A1 | * | 9/2017 | B26B 21/14 |
| WO | WO-2018184723 A1 | * | 10/2018 | B26B 21/60 |

OTHER PUBLICATIONS

Xu et al. (2016). "Ultrastiff and Strong Graphene Fibers via Full-Scale Synergetic Defect Engineering". Advanced Materials. 28 (30): 6449-6456,.

Xu et al. (2015), "Graphene fiber: a new trend in carbon fibers". Materials Today, vol. 18, Issue 9, 2015, pp. 480-492.

Bai et al. (2018). "Carbon nanotube bundles with tensile strength over 80 GPa". Nature Nanotechnology. 13 (7): 589-595.

* cited by examiner

RAZOR HAVING A HAIR-CUTTING FIBER

CROSS REFERENCE TO RELATED APPLICATIONS

This application is the U.S. National Phase application under 35 U.S.C. § 371 of International Application No. PCT/EP2021/051683 filed Jan. 26, 2021, which claims the benefit of European Patent Application Number 20155431.8 filed Feb. 4, 2020. These applications are hereby incorporated by reference herein.

FIELD OF THE INVENTION

The invention relates to a razor comprising:

a hair-cutting fiber having a hair-cutting section arranged for cutting through hairs on skin of a user by moving the hair-cutting section through the hairs;

a support to which opposite end portions of the hair-cutting section are attached; and a skin engaging surface;

wherein the hair-cutting section is attached to the support in such a position relative to the skin engaging surface that the hair-cutting section is exposed to the skin for cutting through the hairs when the skin engaging surface is in contact with the skin and moved over the skin.

The invention further relates to a method of shaving hairs present on skin by means of such a razor.

BACKGROUND OF THE INVENTION

Razors for shaving hairs are known for centuries. Before the advent of electric dry shaving (using electric shavers of which a hair-cutting member is rotated or oscillated by means of electric power), shaving was usually done by means of a safety blade razor and involved moisturizing the skin and the hairs to be shaved to soften the hairs by applying a lathering agent such as cream, shaving soap, gel, foam or oil as a lubricant to the skin and the hairs. Lubricating and moisturizing the skin and the hairs to be shaved reduces irritation by reducing friction between the razor blades and the skin and the hairs being cut. Such so-called 'wet shaving' by means of a safety blade razor is still preferred by many, in spite of the need of applying water and a lathering agent to the skin surface and the hairs to be shaved before shaving and the need of removing residues of the lathering agent after shaving.

WO 2006/003641 discloses a razor of the type mentioned here before in the section "Field of the Invention". This known razor comprises a hair-cutting head wherein an elongated heated wire is suspended for shaving, cutting or burning hairs growing from skin. The wire has a diameter between 10 and 1000 μm and is made from an electrically conductive metal. The wire is heated to a temperature of at least 700° C. When the heated wire contacts a hair, the hair will melt and, as a result, can be easily cut through by the wire. A disadvantage of this know wire-based razor is that any contact between the heated wire and the skin must be prevented to avoid the heated wire from causing damage to the skin and from coming into electrical contact with the skin.

SUMMARY OF THE INVENTION

It is an object of the present invention to provide a razor and a method of shaving hairs of the types mentioned here before in the section "Field of the Invention", that allow cutting through of hairs close to the skin by means of a hair-cutting fiber without the need to heat the hair-cutting fiber, and without the need to first moisturize the skin and the hairs to be shaved or to first apply a lathering agent to reduce the cutting forces required to cut through the hairs.

According to the invention, this object is achieved by providing a razor according to claim 1 and by providing a method of shaving hairs according to claim 16.

Because the razor according to the invention has a hair-cutting fiber with a relatively small fiber diameter, cutting through of individual hairs is possible by means of the hair-cutting fiber using acceptably low cutting forces, in particular cutting forces lower than 0.06 N, and without pre-wetting the skin and the hairs or pre-heating the hair-cutting fiber or the hairs. The fiber diameter of 7 μm or smaller allows initial notch forming on the hair by the hair-cutting section of the hair-cutting fiber when the hair-cutting section is brought into contact with the hair at such a low cutting force. Subsequently, during further cutting through of the hair, the friction forces exerted by the hair being cut onto the hair-cutting section of the hair-cutting fiber are very small compared to the friction forces exerted by hairs being cut onto a safety razor blade, because the area of friction contact between the hair tissue and the hair-cutting section is very small as compared to blade shaving. As a result of said relatively low friction forces during cutting through of the hair, dry shaving is possible at an acceptably low cutting force without requiring a motor-driven movement of a hair-cutting member and, in particular, without heating of the hair-cutting fiber. Furthermore, in the razor according to the invention, the tensile strength of the fiber material of at least 5 GPa prevents the hair-cutting fiber from breaking during the hair-cutting process under the influence of the required hair-cutting forces. Such a tensile strength can be met by certain fiber materials.

Particular elaborations and embodiments of the invention are set forth in the dependent claims.

Further features, effects and details of the invention appear from the detailed description and the drawings.

DETAILED DESCRIPTION OF THE EMBODIMENTS

Figure 1:
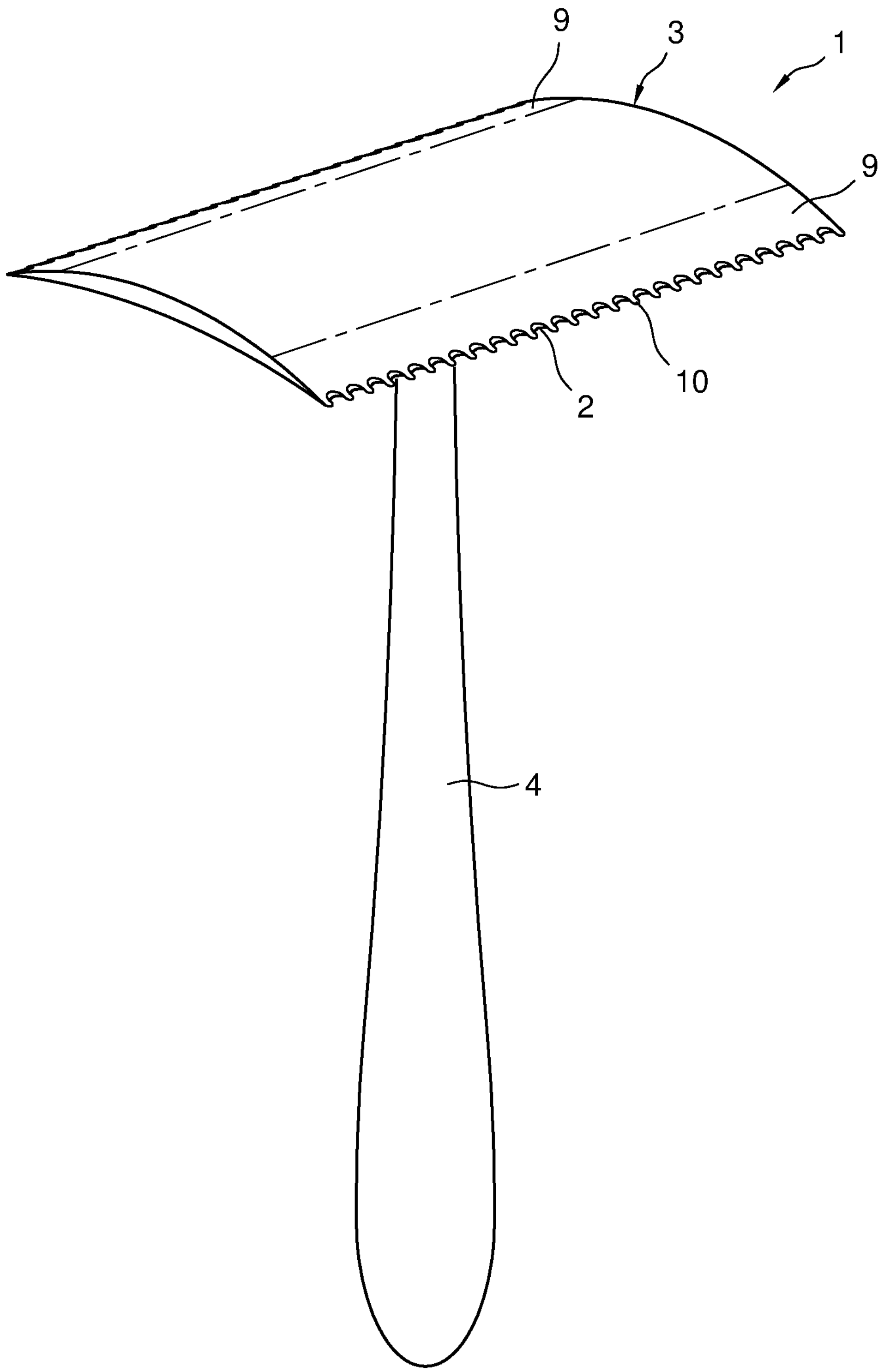
FIG. 1 is a perspective view of an example of a razor according to the invention.
Figure 2:
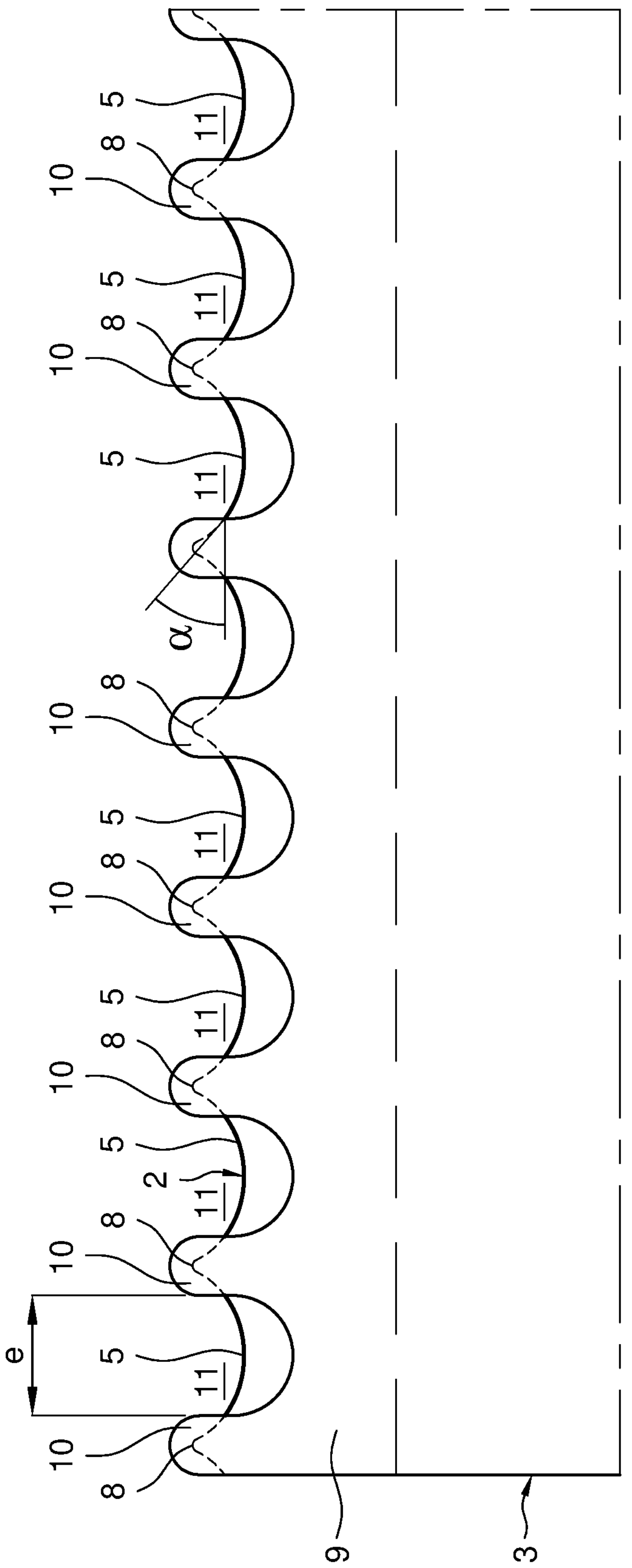
FIG. 2 is a plane view of a portion of the razor shown in FIG. 1.
Figure 3:
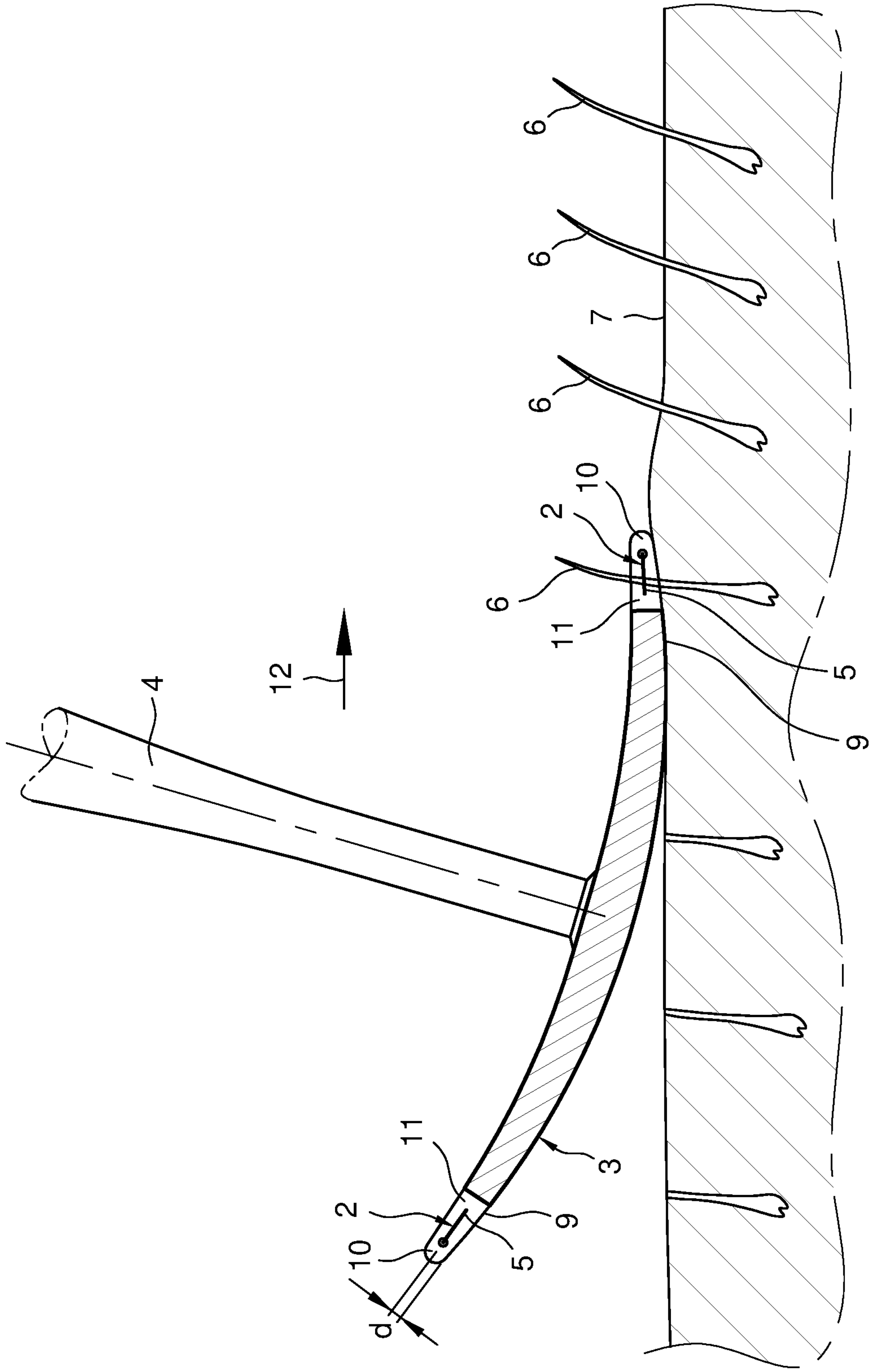
FIG. 3 is a cross-sectional side view of a portion of the razor shown in FIGS. 1 and 2, while in use.

FIGS. 1-3 show an example of a razor 1 according to the invention. The razor 1 shown in FIG. 1 has a hair-cutting fiber 2 and a support 3 to which the hair-cutting fiber 2 is attached. A handle 4 for holding and manipulating the razor 1 is attached to the support 3. As is best seen in FIGS. 2 and 3, the hair-cutting fiber 2 has a plurality of hair-cutting sections 5 for cutting through hairs 6 projecting from a skin surface 7 by moving the hair-cutting fiber 2 through the hairs 6.

On opposite sides of the hair-cutting sections 5, opposite end portions 8 of the hair-cutting sections 5 are attached to the support 3. The support 3 has a skin engaging surface 9. The hair-cutting sections 5 are attached to the support 3 in such positions relative to the skin engaging surface 9, that the hair-cutting sections 5 are exposed to the skin 7 for cutting through the hairs 6 projecting therefrom when the skin engaging surface 9 is in contact with the skin 7 and moved over the skin 7. The hair-cutting sections 5 each have a fiber diameter smaller than or equal to 7 μm and the hair-cutting sections 5 are made from a fiber material having a tensile strength larger than or equal to 5 GPa. Preferably, the hair-cutting sections 5 each have a fiber diameter smaller than or equal to 4 μm and more preferably the hair-cutting sections 5 each have a fiber diameter smaller than or equal to 2 μm. Preferably, the hair-cutting sections 5 are made from a material having a tensile strength larger than or equal to 6 GPa and more preferably larger than or equal to 10 GPa.

For ease of manufacturing, preferably all of the hair-cutting fiber 2 is made of the same material. The hair-cutting sections 5 can for instance be made from a high tensile strength carbon fiber material. An example of such a fiber material is Toray™ T1100S which is commercially available and has a tensile strength of 7 GPa. For achieving higher tensile strengths, the hair-cutting sections 5 can include or be in the form of a carbon nano tube or of graphene fiber. Such fiber materials are for instance disclosed in:

Xu et al. (2016). "Ultrastiff and Strong Graphene Fibers via Full-Scale Synergetic Defect Engineering". Advanced Materials. 28 (30): 6449-6456, Xu et al. (2015), "Graphene fiber: a new trend in carbon fibers". Materials Today, Volume 18, Issue 9, 2015, Pages 480-492, and Bai et al. (2018). "Carbon nanotube bundles with tensile strength over 80 GPa". Nature Nanotechnology. 13 (7): 589-595.

Over time, many innovations in blade shaving technology have been aiming at a reduction of the hair-cutting forces, such as by applying Teflon coatings and Diamond like Carbon coatings on the blade tip and by applying special blade tip shapes. These innovations have allowed shaving using a plurality of blades in a blade cartridge while maintaining drag during shaving at an acceptable level. However, drag is still substantial, in particular when shaving without wetting and lubricating is attempted, because a substantial amount of blade material is in contact with the hair during cutting-through of the hair, which results in substantial friction forces between the blade and the hair.

When cutting with a fiber, the cutting load exerted onto the "cutting element" strongly differs from the cutting load exerted onto a conventional cutting blade. The cutting edge of a conventional blade is supported by a bulk of material adjacent to the cutting edge. This results in compression of the bulk material directly behind the cutting edge and, depending on the mounting of the blade, a mild bending stress in the bulk material. When cutting with a flexible fiber, which may be a wire, the cutting force results in a substantial tensile stress in the fiber. When cutting a very weak material, like soft cheese, the tensile stress stays way below the tensile strength of steel. However, when cutting a harder material, for instance wood, the tensile stress tends to exceed the tensile strengths of even the strongest steel types.

Yield strength and Young's modulus of beard hair and other human hair are roughly in the range of those of wood. It is therefore readily clear that the tensile stress occurring in a fiber cutting through hair would generally exceed the tensile strength of even high tensile strength steel wire.

Furthermore, because hair is of a small thickness and therefore flexible, for a fiber to be able to cut through a hair having a free end projecting from a skin surface, the diameter of the fiber needs to be very small to be able to create an initial notch in the hair without causing the hair to flex away to such an extent that the fiber slides off the surface of the hair to be cut. A typical blade cutting edge has a tip radius in the range of 0.05-0.1 μm to create the initial notch. The force needed to create the initial notch with such a sharp edge is smaller than 0.001N. For cutting hair with a fiber, this initial notch creation force is important. Also the maximum cutting force when the fiber is passing through the hair material at the maximum hair diameter is relevant, as this maximum cutting force determines the required tensile strength of the fiber.

The cutting force increases and decreases when the diameter of the fiber respectively increases and decreases, while the tensile strength of a fiber varies with the cross-sectional surface area, i.e. quadratically with the diameter. Thus, for example, when reducing the diameter of a fiber by a factor two, the tensile strength reduces by a factor four.

The invention is based on the insight that there is nevertheless a window of fiber diameters in which, on the one hand, notch forming forces and cutting forces are low enough to allow a fiber to cut through a hair without causing too much tilting and flexing of the hair, while, on the other hand, tensile stress requirements can be met by certain fiber materials.

Because the razor 1 has a hair-cutting fiber 2 with a relatively small fiber diameter, cutting through of individual hairs 6 is possible by means of the hair-cutting fiber 2 using acceptably low cutting forces, in particular cutting forces lower than 0.06 N, and without pre-wetting the skin surface 7 and the hairs 6 or pre-heating the hair-cutting fiber 2 or the hairs 6. The fiber diameter of 7 μm or smaller allows initial notch formation on the hairs 6 by the hair-cutting sections 5 of the hair-cutting fiber 2 when a hair-cutting section 5 is brought into contact with a hair 6 at such a low cutting force. Subsequently, during further cutting through of the hair 6, the friction forces exerted by the hair 6 being cut onto the hair-cutting section 5 of the hair-cutting fiber 2 are very small compared to the friction forces exerted by hairs being cut onto a safety razor blade, because the area of friction contact between the hair tissue and the hair-cutting section 5 is very small as compared to blade shaving. As a result of the relatively low friction forces during cutting through of the hair 6, dry shaving is possible at an acceptably low cutting force without requiring a motor-driven movement of a hair-cutting member and, in particular, without heating of the hair-cutting fiber 2. The tensile strength of the fiber material of at least 5 GPa prevents the hair-cutting fiber 2 from breaking during the hair-cutting process under the influence of the required hair-cutting forces. Such a tensile strength can be met by certain fiber materials.

The bending radius of the hair-cutting fiber 2 around the hair 6 being cut has been found to have a significant influence on the maximum tensile stress in the hair-cutting fiber 2 during the cutting process. The contribution to tensile stress by said bending radius increases when the diameter of the hair-cutting fiber 2 increases and when the bending angle of the hair-cutting fiber 2 around the hair 6 during cutting increases. With optimization of the extent to which the hair-cutting fiber 2 is bent during cutting, the tensile stress in the hair-cutting fiber 2 during cutting can be minimized. For keeping the bending stress and the friction sufficiently low, the fiber diameter of the hair-cutting section 5 is preferably smaller than or equal to 4 μm.

To avoid too high tensile stresses, it is preferred that the fiber diameter of the hair-cutting section 5 is larger than or equal to 0.5 μm. In view of the availability of fibers of sufficient strength and to avoid the need of using excessively costly fibers, it is preferred that the tensile strength of the fiber material is smaller than or equal to 80 GPa and, more preferably, smaller than or equal to 50 GPa.

As is best seen in FIG. 3, in use the skin engaging surface 9 is brought in contact with the skin 7 and moved over the skin 7 in a shaving direction 12. The hair-cutting sections 5 of the hair-cutting fiber 2 are attached to the support 3 in such a position that the hair-cutting sections 5 move along the skin 7. The distance d between the hair-cutting sections 5 and the skin engaging surface 9 is selected so that the skin 7 bulging up in front of the skin engaging surface 9 and into free spaces 11 in which the hair-cutting sections 5 are arranged, at most just slightly touches the hair-cutting sections 5.

Although shaving can also be carried out in the absence of water and/or a shaving lubricant applied to the skin, i.e. when the skin is substantially dry, in accordance with personal preferences and to further decrease friction and enhance cutting action, the skin can be wetted and/or a shaving lubricant can be applied. The razor then provides a particularly comfortable and low friction shaving experience.

For keeping tensile loads on the hair-cutting fiber 2 during cutting low, the hair-cutting fiber 2 is preferably suspended so as to allow a substantial amount of sagging of the hair-cutting section 5 during cutting. For this purpose, the hair-cutting fiber 2 is preferably suspended by the support 3 so that, in unloaded condition, the hair-cutting sections 5 each extend between the opposite end portions 8 as a curved section of the hair-cutting fiber 2. As shown in detail in FIG. 2, the hair-cutting sections 5 preferably project from the opposite end portions 8, where the hair-cutting fiber 2 is attached to the support 3, in directions at angles α of at least 25° relative to a straight line extending through the opposite end portions 8 of the hair-cutting section 5. To avoid excessive bending of the hair-cutting sections 5 around the hairs during cutting, the hair-cutting fiber 2 is preferably suspended such that, in unloaded condition, the hair-cutting sections 5 project from the opposite end portions 8, where the hair-cutting fiber 2 is attached to the support 3, in directions at angles α of at most 65° relative to the straight line through the opposite end portions 8 of the hair-cutting sections 5. The deflection relative to the straight line through the opposite end portions 8 of the hair-cutting sections 5 is preferably in a direction opposite to the shaving direction 12 in which the razor 1 is to be moved over the skin 7.

To provide a sufficiently high hair-catching ability of the hair-cutting fiber 2, the razor 1 has a plurality of hair-cutting sections 5 each suspended in a respective one of a plurality of open spaces 11 provided in the support 3. A further advantage of having the plurality of hair-cutting sections 5 each suspended in a separate free space 11 provided in the support 3 is that, if a hair-cutting section 5 breaks, the other hair-cutting sections 5 remain available for cutting hair, so shaving can be continued. In the example of FIG. 2, the hair cutting sections 5 are arranged in a straight row and each suspended in the open space 11 provided between opposite portions 10 of the support 3, so that the hair cutting sections 5 can easily follow curvatures in the surface of the skin 7 in a direction perpendicular to the row.

In the example of FIG. 2, the support 3 has a comb structure in which the open spaces 11 are provided between successive pairs of adjacent comb teeth 10 of the comb structure. The opposite end portions 8 of each hair-cutting section 5 are each attached to a respective one of the pair of adjacent comb teeth 10 associated with that hair-cutting section 5. It is however also possible to provide the support in other forms, such as in the form of support portions arranged along openings, such as holes or slits, in the support or in the form of support portions arranged along depressions in the skin engaging surface of the support.

The open spaces 11 preferably each have a width e smaller than or equal to 0.6 mm in a main direction of extension of the hair-cutting section 5 suspended in that open space 11, so that only a single hair 6 can enter the open space 11 at a time and be cut by the hair-cutting section 5 arranged in the open space 11. This avoids exerting cutting loads by two or more hairs simultaneously onto the same hair-cutting section 5. To ensure that the hairs to be cut do individually fit in each of the open spaces 11 between the comb teeth 10 of the support 3 in which the hair-cutting sections 5 are suspended, the width e of the open spaces 11 is preferably larger than or equal to 0.1 mm. The limited width e of the open spaces 11 also limits uncontrolled free motions of the loosely suspended hair-cutting sections 5 as well as excessive skin doming (bulging) into the open spaces 11 (cf. FIG. 3). Thus, inadvertent cutting of the skin or too much abrasion or other irritation of skin tissue can be avoided. The support 3 can be made from metal, such as stainless steel, but can also consist of other materials such as plastic or ceramic material.

The opposite end portions 8 of the hair-cutting fiber 2 can for instance be attached to the comb teeth 10 of the support 3 by an adhesive and/or by mechanical clamping. The support 3 can be rigid, but can also be flexible to allow the support 3 to adapt its shape to the contours of the skin 7 during use.

In the present example, the positions of the hair-cutting sections 5 relative to the surface of the skin 7 are controlled accurately and in a simple manner, because the skin engaging surface 9 includes skin engaging tooth surfaces of the comb teeth 10. However other arrangements are also conceivable. For instance, the skin engaging surface can be formed on a housing in which the support to which the hair-cutting fiber is attached is releasably mounted. This would allow exchanging the support including the hair-cutting fiber in the event the hair-cutting fiber has too many breakages. Also the support and the hair-cutting fiber could be designed for use as a replacement of a conventional replaceable razor blade or, with or without a skin engaging surface on the support, as a replacement of a conventional razor blade cartridge.

Figure 4:
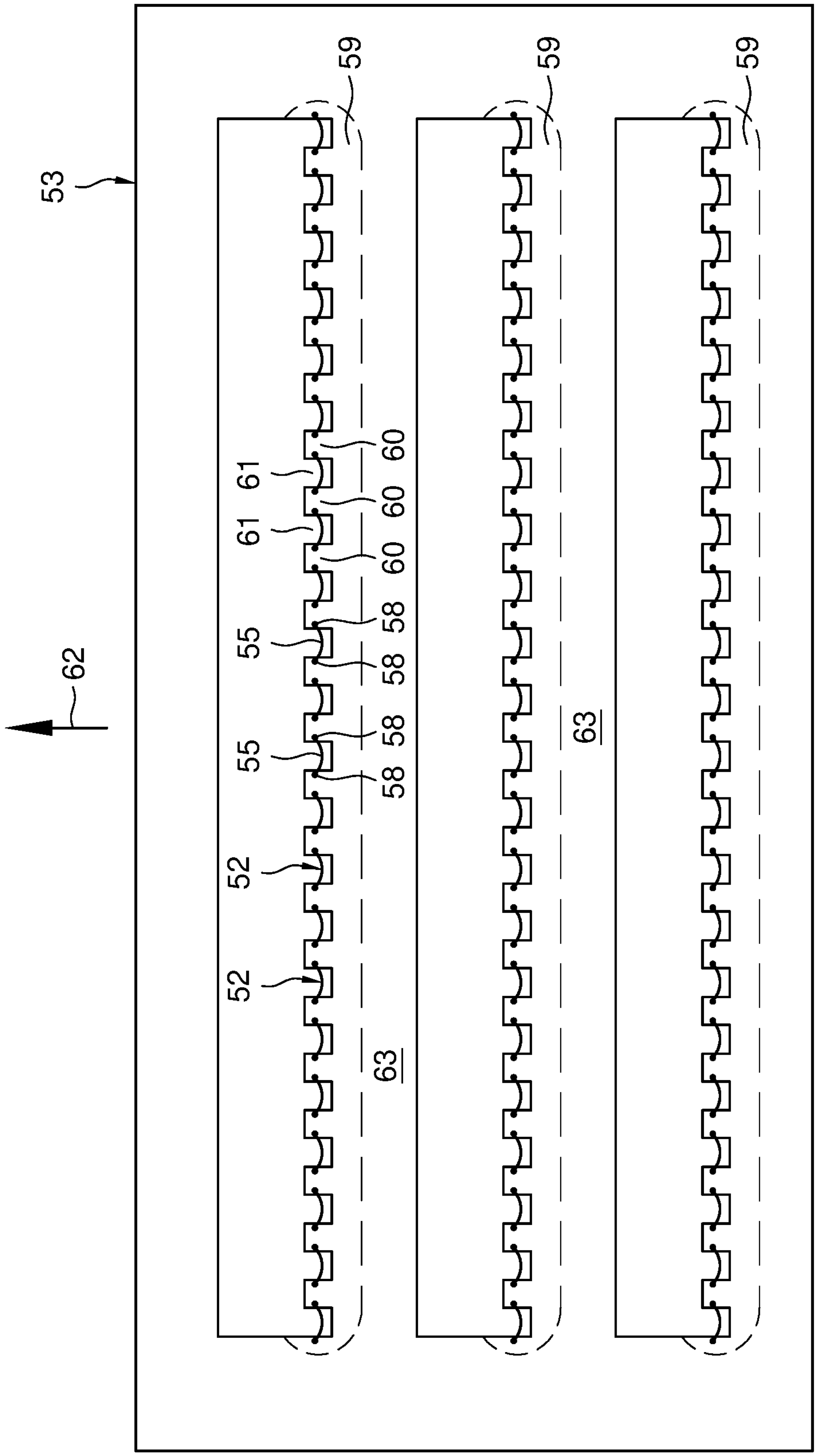
FIG. 4 is a plane view of a portion of a second example of a razor according to the invention.
Figure 5:
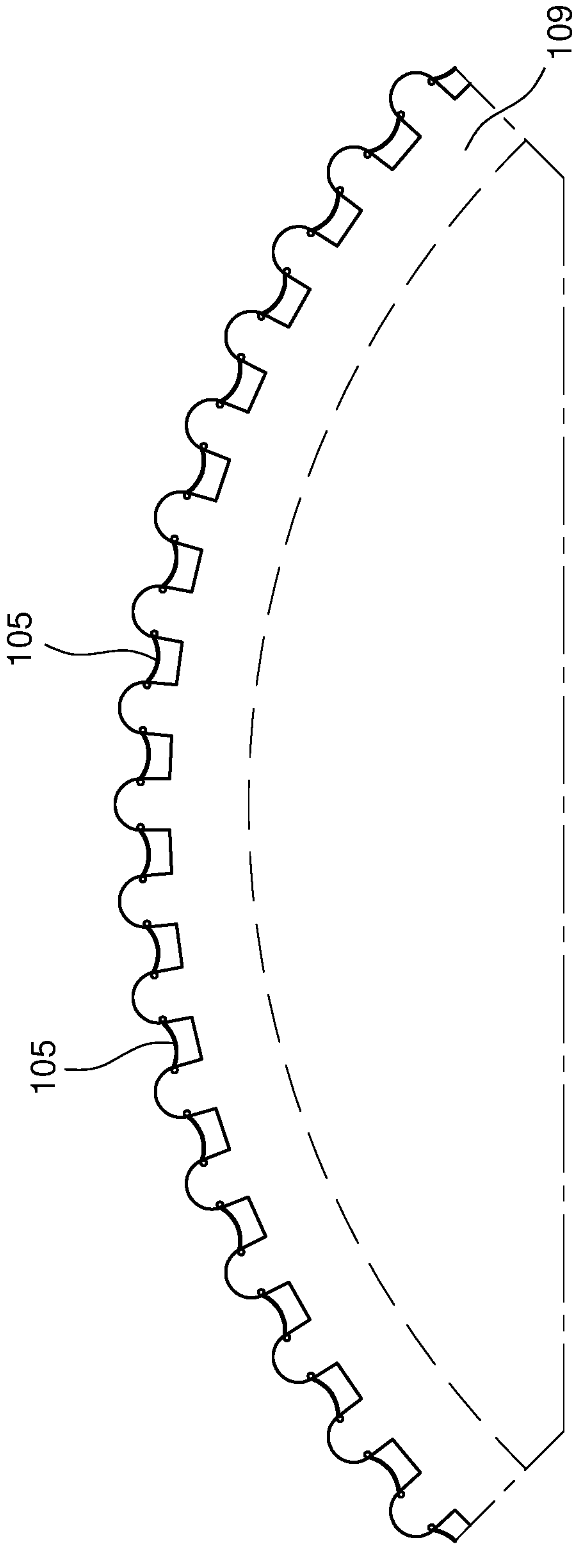
FIG. 5 is a plane view of a portion of a third example of a razor according to the invention.

In the present example, the plurality of hair-cutting sections 5 form parts of one single hair-cutting fiber 2. This facilitates manipulation of the hair-cutting fiber 2 during manufacturing of the razor 1. It is however also possible that two or more groups of hair-cutting sections are each part of two or more separate hair-cutting fibers, so that the hair-cutting sections form parts of two or more hair-cutting fibers. Furthermore, as in the examples shown in FIGS. 4 and 5, each of the hair-cutting fibers 52 may have only a single hair-cutting section 55, 105. In FIGS. 4 and 5 not all corresponding parts are designated by reference numbers. As shown in FIG. 4, the opposite end portions 58 of each hair-cutting section 55 are mounted to a respective one of the pair of adjacent comb teeth 60, so that the hair-cutting sections 55 each extend in a respective one of the open spaces 61 present between pairs of adjacent comb teeth 60.

As is also illustrated by FIG. 4, a plurality of parallel rows of hair-cutting sections 55 for cutting in a shaving direction 62 can be arranged in a single support 53. Such an arrangement can provide an accurate spacing between skin stretching surfaces 63 and the hair-cutting sections 55 as well as a plurality of skin engaging surfaces 59 for an even distribution of shaving pressure.

As is illustrated by FIG. 5, the row of hair-cutting sections 105 can be curved, thereby forming a convex border of the skin engaging surface 109 allowing a better accommodation to some curvatures of the face. For other curvatures, a concave border of the skin engaging surface 109 can provide a better accommodation.

While the invention has been described and illustrated in detail in the foregoing description and in the drawing figures, such description and illustration are to be considered exemplary and/or illustrative and not restrictive; the invention is not limited to the disclosed embodiments.

Several features have been described as part of the same or separate embodiments. However, it will be appreciated that the scope of the invention also includes embodiments having combinations of all or some of these features other than the specific combinations of features embodied in the examples.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. For the purpose of clarity and a concise description, features are disclosed herein as part of the same or separate embodiments; however, it will be appreciated that the scope of the invention may include embodiments having combinations of all or some of the features disclosed. The mere fact that certain measures are recited in mutually different dependent claims does not indicate that a combination of these measures can not be used to advantage. Any reference signs in the claims should not be construed as limiting the scope.

The invention claimed is:

1. A razor comprising:

a hair-cutting fiber having a hair-cutting section arranged for cutting through hairs on skin of a user by moving the hair-cutting section through the hairs;

a support to which opposite end portions of the hair-cutting section are attached; and a skin engaging surface;

wherein:

the hair-cutting section is attached to the support in such a position relative to the skin engaging surface that the hair-cutting section is exposed to the skin for cutting through the hairs when the skin engaging surface is in contact with the skin and moved over the skin, the hair-cutting section has a fiber diameter smaller than or equal to 7 μm, and the hair-cutting section is a fiber material having a tensile strength larger than or equal to 5 GPa.

2. The razor according to claim 1, wherein the cutting section is a carbon material.

3. The razor according to claim 2, wherein the hair-cutting section comprises a carbon nano tube or a graphene fiber.

4. The razor according to claim 1, wherein the hair-cutting section extends between the opposite end portions as a curved section of the hair-cutting fiber.

5. The razor according to claim 1, wherein the razor comprises a plurality of hair-cutting sections which are each suspended in a respective one of a plurality of open spaces provided in the support.

6. The razor according to claim 5, wherein the open spaces each have a width smaller than or equal to 0.6 mm in a main direction of extension of the hair-cutting section suspended in the respective open space.

7. The razor according to claim 5, wherein the support comprises a comb structure, and wherein the plurality of open spaces are provided between successive pairs of adjacent comb teeth of the comb structure.

8. The razor according to claim 7, wherein the opposite end portions of each hair-cutting section are each attached to a respective one of the pair of adjacent comb teeth associated with the hair-cutting section.

9. The razor according to claim 7, wherein the skin engaging surface includes skin engaging tooth surfaces of the comb teeth.

10. The razor according to claim 5, wherein the plurality of hair-cutting sections form parts of one single hair-cutting fiber.

11. The razor according to claim 5, wherein the plurality of hair-cutting sections form parts of at least two separate hair-cutting fibers.

12. The razor according to claim 1 wherein the opposite end portions of the hair-cutting section are attached to the support by an adhesive and/or are clamped to the support.

13. The razor according to claim 1, wherein the fiber diameter of the hair-cutting section is larger than or equal to 0.5 μm.

14. The razor according to claim 1, wherein the fiber diameter of the hair-cutting section is smaller than or equal to 4 μm.

15. The razor according to claim 1, wherein the tensile strength of the fiber material is smaller than or equal to 80 GPa.

16. A method of shaving hairs present on skin, comprising:

providing a razor according to claim 1; and bringing the skin engaging surface of the razor in contact with the skin and moving the razor over the skin with the skin engaging surface in contact with the skin, such that the hair-cutting section of the hair-cutting fiber of the razor cuts through the hairs.

17. The method according to claim 16, wherein the hairs, the skin, and the hair-cutting fiber are substantially dry.

* * * * *